United States Patent [19]
Masao

[11] Patent Number: 5,293,257
[45] Date of Patent: Mar. 8, 1994

[54] MOBILE SIZE INDEPENDENT IMAGE INPUT/OUTPUT APPARATUS AND PLATE

[76] Inventor: Katsuya Masao, 7190 103, 4-9-24 Nishikicho, Tachikawa Shi, Tokyo, Japan

[21] Appl. No.: 800,913

[22] Filed: Dec. 5, 1991

[30] Foreign Application Priority Data

Dec. 11, 1990 [JP] Japan .................. 2-415727
Dec. 11, 1990 [JP] Japan .................. 2-415728

[51] Int. Cl.⁵ .................................. H04N 1/10
[52] U.S. Cl. .......................... 358/472; 358/296; 358/474; 358/476; 358/497
[58] Field of Search .......... 358/401, 472, 442, 473, 358/497, 494, 476, 471, 296, 442, 406; 382/59, 58; 346/143, 112, 113; H04N 1/028, 1/032, 1/10

[56] References Cited

U.S. PATENT DOCUMENTS

| | | |
|---|---|---|
| Re. 33,425 | 11/1990 | Nihei .................. 358/497 |
| 4,438,459 | 3/1984 | Levine .................. 358/406 |
| 4,523,235 | 6/1985 | Rajchman .................. 358/473 |
| 4,717,965 | 1/1988 | Mashiko et al. .................. 358/497 |
| 4,793,812 | 12/1988 | Sussman et al. .................. 358/473 |
| 5,168,377 | 12/1992 | Nagano .................. 358/497 |

*Primary Examiner*—Stephen Brinich
*Assistant Examiner*—Jill Jackson
*Attorney, Agent, or Firm*—Armstrong, Westerman, Hattori, McLeland & Naughton

[57] ABSTRACT

An image input/output apparatus for inputting images written on a plate and for outputting images on the plate. The image input/output apparatus is movable on the plate, and has a size independent from the size of the plate. The apparatus comprises a mobile assembly movable on the plate, an image pick-up device mounted on the mobile assembly, for picking up images written on the plate, wherein the image pick-up device picking up the images on the plate while the mobile assembly is moving on the plate; and printing device, mounted on the mobile assembly, for printing, in accordance with given image data, images on the plate.

41 Claims, 5 Drawing Sheets

MOBILE SIZE INDEPENDENT IMAGE INPUT/OUTPUT APPARATUS AND PLATE

BACKGROUND OF THE INVENTION (1) Field of the Invention

The present invention relates to an image input/output apparatus for inputting images such as characters or figures written on a plate such as a paper and for transmitting the input data to a computer and so forth, or for printing images on the plate in response to character/figure data given by the computer and so forth.

(2) Description of the Related Art

In a conventional image input apparatus, which is called an image scanner, a frame having a certain size as large as at least the size of a paper from which the image is to be read is provided. Along the frame, a line sensor is moved on the paper to pick up the image such as characters or figures.

In a conventional image output apparatus, which is called a plotter or a printer, also, a frame having a certain size as large as at least the size of a paper on which the image is to be written is provided. The paper shuld be placed on a plate having a certain size. Along the frame, a printing tool such as a pen or a printing head is moved in the upper, lower, right, or left direction to draw the characters of figures.

Therefore, in the conventional image input or output apparatus, the paper on which the images are to be written or from which the images are to be read must have a size smaller than that of the frame for holding the line sensor or the printing head. In other words, the maximum area of a paper on which the images can be written or from which the images are read is limited mainly by the size of the frame of the apparatus. This is very inconvenient for a user because if he wants to write or read images on or from a paper having a large size larger that the size of the frame of the apparatus, he must change the apparatus to another apparatus having a longer frame.

In addition, since the size of the conventional image input apparatus or the conventional image output apparatus is mainly determined by the size of the frame, the conventional image input apparatus or the conventional image output apparatus must have a large size larger that the maximum size of a paper from which the image is to be read or on which the image is to be written. Therefore, if the conventional image input or output apparatus is placed on a desk, the apparatus occupy a considerable area on the desk because of the large size of the frame. This is also inconvenient for a user because it is difficult to put another document and so forth on the desk since the main part of the desk is occupied by the apparatus.

Further, because of the large size of the conventional input or output apparatus, its cost is high.

Still further, conventionally, the image input apparatus and the image output apparatus are separated.

SUMMARY OF THE INVENTION

Accordingly, an object of the present invention is to provide an image input apparatus having a decreased size and which can pick up an image on a plate regardless of the size of the plate.

Another object of the present invention is to provide an image output apparatus having a decreased size and which can write an image on a plate regardless of the size of the plate.

Still another object of the present invention is to provide an input/output apparatus having a decreased size and which can pick up an image on a plate and write an image on a plate regardless of the size of the plate.

To attain the above object, there is provided, according to the present invention, an image input apparatus for inputting images written on a plate. The apparatus comprises a mobile assembly device movable on the plate, and an image pick-up device, mounted on the mobile assembly device, for picking up images written on the plate. The image pick-up device picks up the images on the plate while the mobile assembly device is moving on the plate.

According to another aspect of the present invention, there is provided an image output apparatus for drawing images on a plate. The apparatus comprises a mobile assembly device movable on the plate; and a printing device, mounted on the mobile assembly device, for printing, in accordance with given image data, images on the plate.

According to still another aspect of the present invention, there is provided an image input/output apparatus for inputting images written on a plate and for outputting images on the plate. The apparatus comprises a mobile assembly device movable on the plate, an image pick-up device, mounted on the mobile assembly device, for picking up images written on the plate. The image pick-up device picks up the images on the plate while the mobile assembly device is moving on the plate. The apparatus further comprises a printing device, mounted on the mobile assembly device, for printing, in accordance with given image data, images on the plate.

BRIEF DESCRIPTION OF THE DRAWINGS

The above objects and features of the present invention will be more apparent from the following description of the preferred embodiments with reference to the drawings, wherein.

DESCRIPTION OF THE PREFERRED EMBODIMENTS

Figure 1:
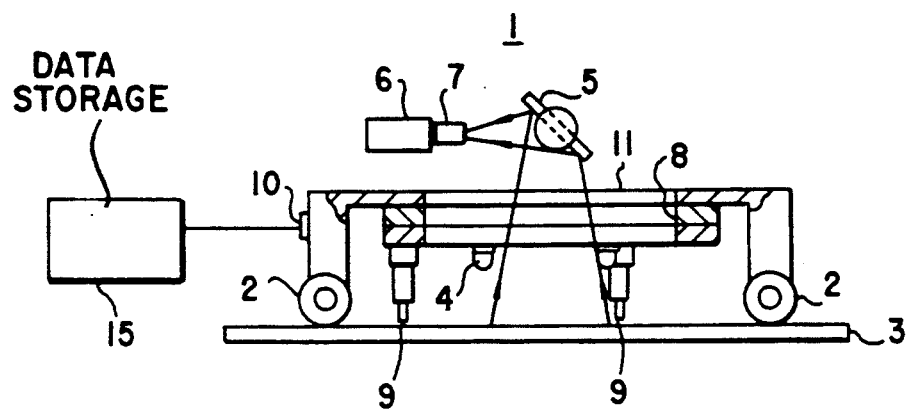
FIG. 1 is a side view of an image input apparatus according to a first embodiment of the present invention.

Throughout the description, the same reference numerals represent the same parts.

Figure 2:
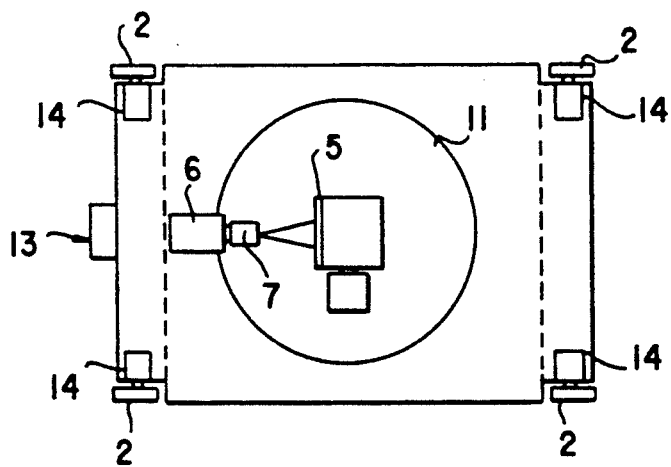
FIG. 2 is a plan view an embodiment of the image input apparatus when viewed from the top side thereof.

FIGS. 1 and 2 show the structure of an image input apparatus according to first embodiments of the present invention. In the figures, 1 is a mobile assembly which is, as a whole, a kind of a robot. The mobile assembly 1 has, generally, a size much smaller than the size of the paper on which images to be picked up are written. Of course, the size of the paper may be as small as the size of the mobile assembly 1. In other word, the size of the paper may be any size.

The mobile assembly has, for example, four wheels 2 which can run on a plate 3 such as a paper or a wooden plate. On the plate 3, images such as characters or figures to be picked up are written. The mobile assembly also has an optical image pick-up assembly including an illuminating device 4 for illuminating the plate 3, a mirror 5 for changing the direction of the light reflected from the plate, a camera 6, and a lens 7 for focusing the light from the mirror 6 onto the camera 6.

The mobile assembly 1 further includes a communication unit (not shown in FIGS. 1 and 2) for communicating with a host processor located outside of the mobile assembly. Numeral 10 represents a conductive wire connected to the host processor. The communication between the host processor and the communication unit can be effected not only through the conductive wire 10 (FIG. 1) but also through wireless means 13 (FIG. 2). The communication unit receives control signals from the host processor for controlling the movement of the mobile assembly 1. The communication unit also sends the picked-up image data to the host processor under a real time process or under a batch process.

The wheels 2 are associated with pulse motors (14) respectively so that the wheels are controlled by controlling the pulse motors. The mobile assembly 1 also has a storage element 15 (shown in FIG. 1) for storing data of the picked-up image.

In general operation, by controlling the motors for driving the right and/or left wheels, the number of rotation of the wheels are controlled, whereby the mobile assembly 1 as a whole is moved to a desired position and placed at a desired azimuth angle.

When the mobile assembly 1 is moved to a target position, it is stopped, and then an image on the plate 3 is picked up by means of the optical image pick-up mechanism.

It is also possible to pick up images while the mobile assembly 1 is moving.

In an example, the mobile assembly 1 may include a turning gear 8 for turning a round table 11 which the mirror 5, the lens 7, and the camera 6 are mounted. By driving the turning gear 8 so as to turn the table 11 while the mobile assembly 1 is stopped, a fine control of the position of the image pick-up mechanism is possible. In addition, projecting rods 9 may be provided which are projecting from the bottom surface of the mobile assembly 1 to the plate 3. In this case, when the turning gear 8 is driven, the projecting rods 9 extend toward the plate 3 in accordance with an instruction from the host processor so that the wheels 2 become floating states. Then a fine adjustment of the angle of rotation of the mobile assembly 1 as a whole is carried out in accordance with an instruction from the host processor.

Figure 3:
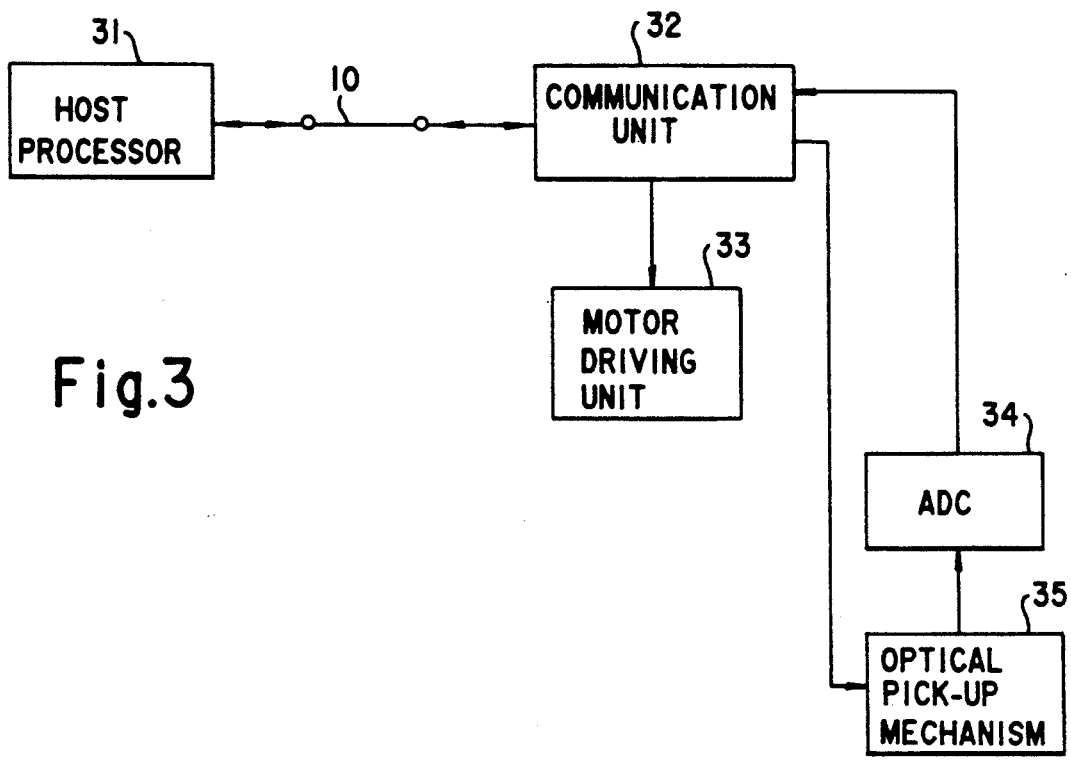
FIG. 3 is a block diagram of an example of an image pick-up system in the apparatus of the first embodiment.

FIG. 3 shows a block diagram of an example of an image pick-up system in the apparatus of the first embodiment. In the figure, 31 is a host processor located outside of the mobile assembly 1. The mobile assembly 1 includes a communication unit 32, a motor driving unit 33, an analog-to digital converter 34, and the optical image pick-up mechanism 35.

The control signals from the processor 31 are sent through the conductive wire 10 or wireless means to the communication unit 32. The communication unit 32 separates the control signals into a command for driving the motors and a command for picking up images on the plate 3. The command for driving the motors is given to the motor driving unit 33 whereby the motors are driven so that the wheels 2 are rotated in accordance with the motor driving command. The command for picking up the images is given to the optical image pick-up mechanism 35 so that images are picked up from the plate 3. The picked up image signal is an analog signal which is converted by the analog-to digital converter 34 to a digital signal, and the digital signal is sent through the communication unit 32 to the host processor 31 and is stored in a memory (not shown) connected to the host processor 31.

Figure 4:
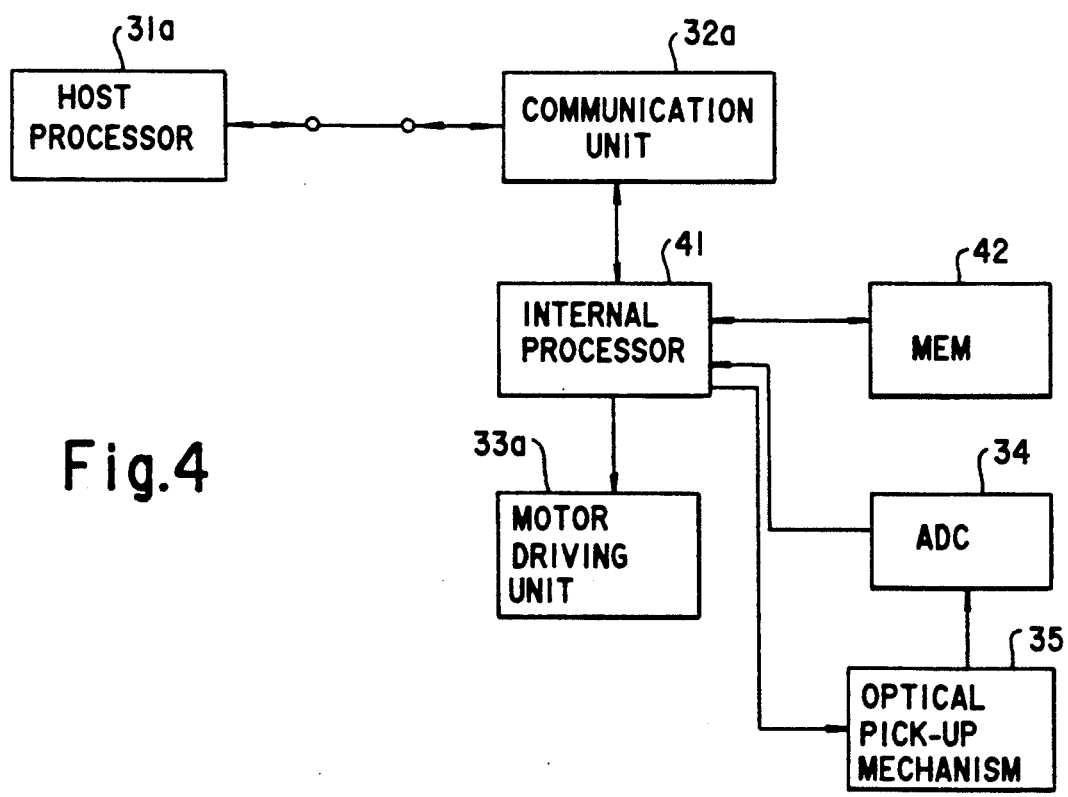
FIG. 4 is a block diagram of another example of an image pick-up system in the apparatus of the first embodiment.

FIG. 4 is a block diagram of another example of an image pick-up system in the apparatus of the first embodiment. The main difference between FIG. 3 and FIG. 4 is that, in FIG. 4, an internal processor 41 is provided on the mobile assembly 1 between a communication unit 32a and a motor driving unit 33a. Further, a memory 42 is connected to the internal processor 41. In this example, the internal processor 41 analyzes the command from the host processor 31a and separates the command into a command for driving the motors and a command for picking up images on the plate 3. The host processor 31a sends a general instruction and the internal processor 41 generates, in response to the general instruction, detailed instructions.

The picked up image signal is an analog signal which is converted by the analog-to digital converter 34 to a digital signal, and the digital signal is stored, under the control of the internal processor 41, to the memory 42. The stored data is sent through the internal processor 41 and the communication unit 32a to the host processor 31a by a real time processing or a batch processing.

By the above-described first embodiment, the image input apparatus can be made as a very small robot which can freely run, without using the conventional scanner holding frame having a size longer than the size of the plate, on the plate on which characters or figures to be picked up are written so that the apparatus can read images on a plate having any size.

Now, an image output apparatus according to the second embodiment of the present invention will be described.

Figure 5:
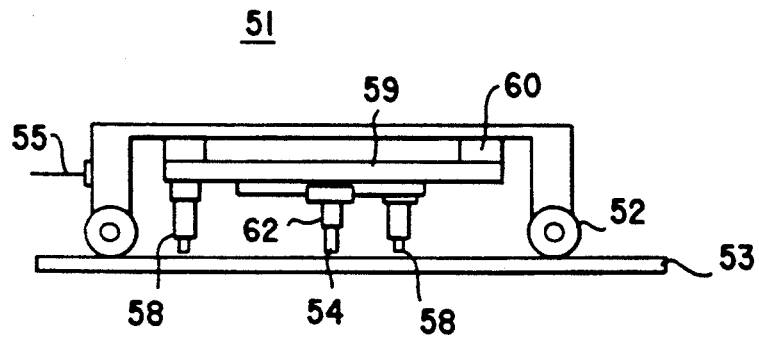
FIG. 5 is a side view of an image output apparatus according to a second embodiment of the present invention.
Figure 6:
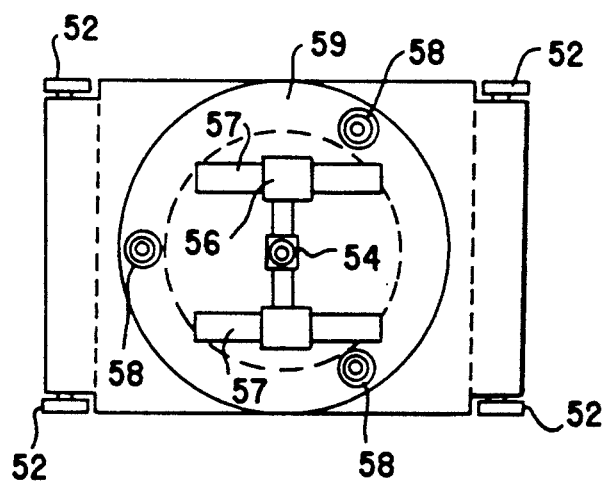
FIG. 6 is a plan view of the image output apparatus shown in FIG. 5 when viewed from the top thereof.

FIG. 5 is a side view of an image output apparatus according to a second embodiment of the present invention, and FIG. 6 is a plan view of the image output apparatus shown in rig. 5 when viewed from the top thereof.

In the figures, 51 is a mobile assembly which is almost the same as the mobile assembly of the first embodiment shown in FIG. 1. Therefore, the detailed description of the Construction of the mobile assembly shown in FIG. 5 is omitted here.

The mobile assembly 51 has, for example, four wheels 52 which can run on a plate 53 such as a paper or a wooden plate. On the plate 53, images such as characters or figures are to be written. The mobile assembly 51 also has a printing mechanism 54 attached to the bottom of the mobile assembly 51. The printing mechanism 54 may be a pen or an ink nozzle connected to an ink-jet type printing head. The printing mechanism 54 is fixed to the mobile assembly 51 and can be moved up and down by pen moving means 62. Alternatively, the printing mechanism 54 may be movable in two directions by means of a second mobile assembly 56. Namely, when the printing mechanism 54 is associated with the second mobile assembly 56, the printing mechanism 54 is movable by moving the second mobile assembly 56 along rails 57. The rails 57 are fixed on a turning table 59. By means of a turning gear 60, the turning table 59 is rotated on the bottom surface of the mobile assembly 51.

Reference numeral 58 represents projecting rods. Similar to the first embodiment, a fine adjustment of the angle of rotation of the mobile assembly 51 as a whole can be carried out by extending the projecting rods 58 to make the assembly 51 to be a floating state.

The mobile assembly 1 further includes a communication unit (not shown in FIGS. 5 and 6) for communicating with a host processor located outside of the mobile assembly 51. Numeral 55 represents a conductive wire connected to the host processor.

In general operation, by controlling the motors for driving the right and/or left wheels, the number of rotation of the wheels are controlled, whereby the mobile assembly 51 as a whole is moved to a desired position and placed at a desired azimuth angle.

When the printing mechanism 54 is fixedly mounted on the bottom of the mobile assembly 51, the images are written while the mobile assembly 51 is moving.

When the mobile assembly 51 is provided with the second mobile assembly 56, the mobile assembly 51 is first moved to a desired position to be stopped thereon. Then, the images are written while the second mobile assembly 56 is moving with respect to the mobile assembly 51.

Figure 7:
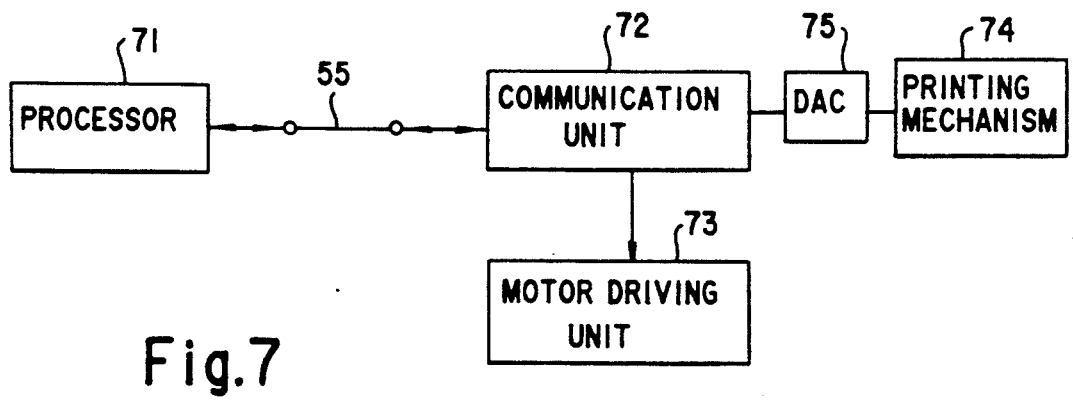
FIG. 7 is a block diagram of an example of an image printing system in the apparatus of the second embodiment.

FIG. 7 is a block diagram of an example of an image printing system in the apparatus of the second embodiment. In the figure, 71 is a host processor located outside of the mobile assembly 51. The mobile assembly 51 includes a communication unit 72, a motor driving unit 73, and the printing-mechanism 74.

The control signals from the processor 71 are sent through the conductive wire 55 or wireless means to the communication unit 72. The communication unit 72 separate the control signals into a command for driving the motors and a command for printing images on the plate 53. The command for driving the motors is given to the motor driving unit 73 whereby the motors are driven so that the wheels 52 are rotated in accordance with the motor driving command. The command for printing the images is a digital signal. The digital signal is converted into an analog signal by the digital-to-analog converter 75. The converted analog signal command is given to the printing mechanism 74 so that image data is written on the plate 53.

Figure 8:
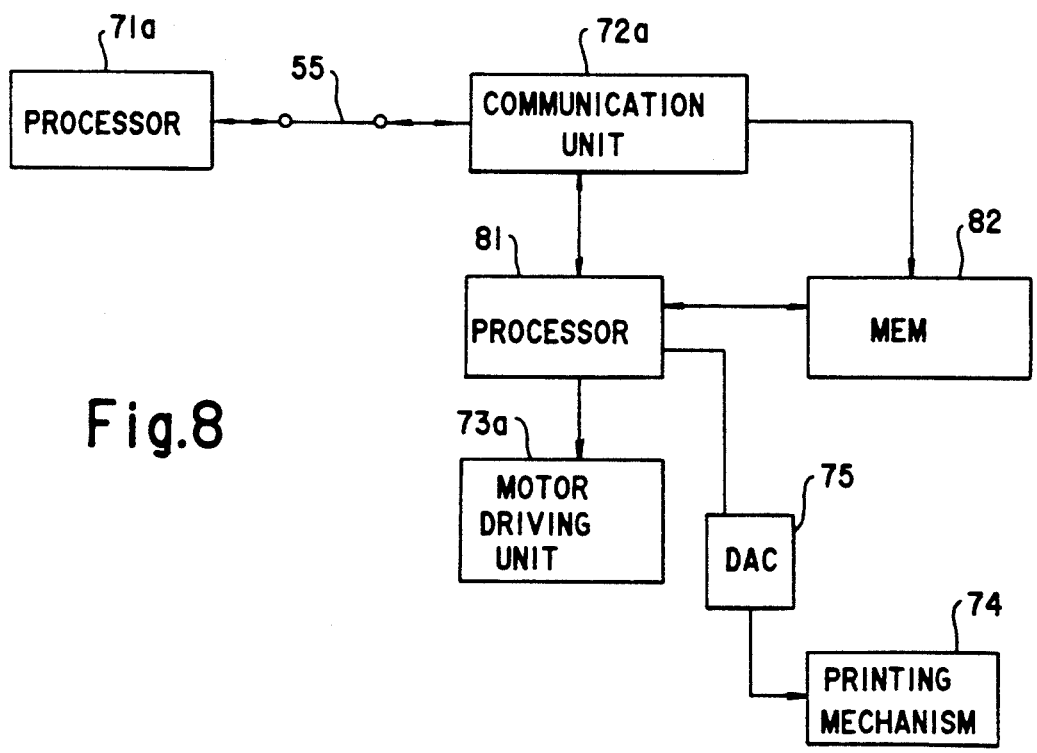
FIG. 8 is a block diagram of another example of an image printing system in the apparatus of the second embodiment.

FIG. 8 is a block diagram of another example of an image printing system in the apparatus of the second embodiment. The main difference between FIG. 7 and FIG. 8 is that, in FIG. 8, an internal processor 81 is provided an the mobile assembly 1 between a communication unit 72a and a motor driving unit 73a. Further, a memory 82 is connected to the internal processor 81. In this example, the internal processor 81 analyses the command from the host processor 71a and separate the command into a command for driving the motors and a command for printing images on the plate 53. The host processor 71a sends a very general instruction and the internal processor 81 generates, in response to the general instruction, detailed instructions.

By the above-described second embodiment, the image output apparatus can be made as a very small robot which can freely run, without using the conventional printing head holding frame having a size longer than the size of the plate, on the plate on which characters or figures are to be written so that the apparatus can print images on a plate having any size.

Figure 9:
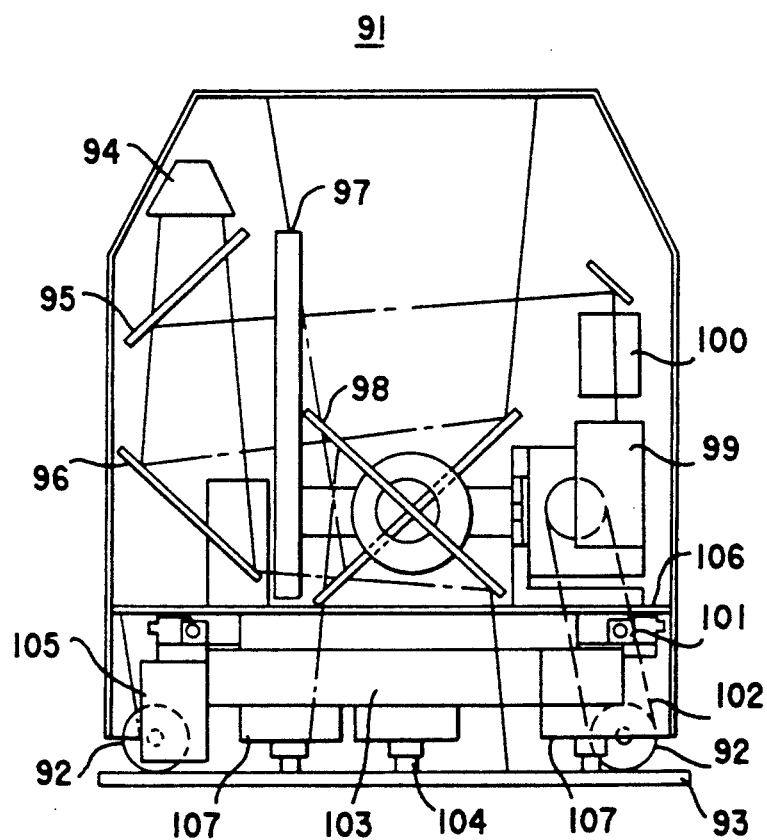
FIG. 9 is a side view of an image input/output apparatus according to a third embodiment of the present invention.

Next, an image input/output apparatus according to the third embodiment of the present invention will be described with reference to FIG. 9 which shows a side view thereof. The image input/output apparatus shown in FIG. 9 is substantially a combination of the image input apparatus shown in FIGS. 1 and 2 and the image output apparatus shown in FIGS. 5 and 6. Namely, the image input/output apparatus shown in FIG. 9 includes a printing mechanism provided at the bottom surface of the mobile assembly 91 and an image pick-up mechanism provided at the front surface of the mobile assembly 91. The image pick-up mechanism includes, for example, four wheels 92 which can run on a plate 93 such as a paper or a wooden plate, an illuminating device 94, a beam splitter 95, a mirror 96, a concave lens 97, a mirror 98 for changing the direction of the light reflected from the plate, a CCD camera 99, and a lens 100 for focusing the light from the beam splitter 95 onto the camera 99. The light reflected from the plate 93 is reflected by the mirror 98, reflected by the mirror 96, reflected by the beam splitter 95, to reach the lens 100.

The printing mechanism includes an ink cartridge 103 and a printing head 104 of an ink-jet type. The printing head is provided at the bottom surface of the mobile assembly 91. To make it possible to print out a number of characters at the same time, the printing head has a long shape crossing the bottom surface of the mobile assembly 91.

Reference numeral 101 represents a turning gear for turning a table 106, and the reference numeral 107 represents projecting rods. The projecting rods 107 are extended by driving solenoides 105 when a fine control of rotation of the assembly 91 as a whole is to be carried out.

The mobile assembly 91 further includes a communication unit (not shown in FIG. 9) for communicating with a host processor located outside of the mobile assembly. The communication between the host processor and the communication unit is effected not only through the conductive wire 10 but through wireless means. The communication unit receives control signals from the host processor for controlling the movement of the mobile assembly 91. The communication unit also sends the picked-up image data to the host processor under a real time process or under a batch process.

The wheels 92 are associated with pulse motors (not shown) respectively so that the wheels are controlled by controlling the pulse motors. The mobile assembly 91 also has a storage element (not shown in FIG. 9) for storing data of the picked-up image or the write data. Instead of storing data in the storage element provided on the mobile assembly 91, the data may be stored in a memory in the outer processor.

In general image pick-up operation, by controlling the motors for driving the right and/or left wheels, the number of rotation of the wheels are controlled, whereby the mobile assembly 91 as a whole is moved to a desired position and placed at a desired azimuth angle.

When the mobile assembly 91 is moved to a target position, it is stopped, and then an image an the plate 93 is picked up by means of the optical image pick-up mechanism.

It is also possible to pick up images while the mobile assembly 91 is moving.

In general writing operation, by controlling the motors for driving the right and/or left wheels, the number of rotation of the wheels are controlled, whereby the mobile assembly 91 as a whole is moved to a desired position and placed at a desired azimuth angle.

When the printing mechanism is fixedly mounted on the bottom of the mobile assembly 91, the images are written while the mobile assembly 91 is moving.

When the mobile assembly 91 is provided with the second mobile assembly 56 as shown in FIG. 6, the mobile assembly 91 is first moved to a desired position to be stopped thereon. Then, the images are written while the second mobile assembly 56 is moving with respect to the mobile assembly 91.

It is also possible to use the assembly 91 as a tablet which is used as a hand writing input machine. Namely, the mirror 98 is rotated by 90 degree so that a light from the top of the assembly 91 is reflected by the mirror 98 to the mirror 96. The light then reflected by the mirror 96 and the beam splitter 95 to be received by the CCD camera 100. Therefore, the light of a hand-written character or figure on the top surface of the assembly 91 passes through a transparent material on the top, is reflected by the mirror 98, the mirror 96, and the beam splitter 95 to be input to the apparatus 91.

The operation of the image input/output apparatus shown in FIG. 9 is further described in detail in the following At step S1, the mobile assembly 91 is placed by hand on a place outside of the plate 92. For example, the mobile assembly 91 is placed at the upper left side of the paper and outside of the paper in such a way that the extended line of the upper end of the paper crosses the line sensor on the mobile assembly 91. Further, the mobile assembly 91 is placed to be parallel to the upper end of the paper. The front surface of the mobile assembly is directed to the left end of the paper.

At step S2, the mobile assembly 91 receives, from the outer processor, control data of a moving range and so forth and image data to be printed. The image data is stored in the memory.

At step S3, the mobile assembly 91 is moved, in accordance with an instruction from the outer processor, to the straight forward direction so as to cross the left end line of the paper. When the line sensor detects that the front surface of the mobile assembly 91 crosses the left end line of the paper, the line sensor detects the position of the upper end of the paper. The Y-direction position y1 at the detected position is stored in the memory.

At step S4, the mobile assembly 91 is further moved in the X direction by a short distance δ x, and the line sensor detects the Y position y2 of the upper end of the paper. From the detected positions y1 and y2, the gradient of the paper with respect to the mobile assembly 91 is determined as (y1−y2)/ δ x.

At step S5, the mobile assembly 91 is rotated in the clockwise direction so as to be parallel to the left end line of the paper.

At step S6, the mobile assembly 91 is moved back and forth until an appropriate distance between the front surface of the mobile assembly 91 and the upper end of the paper is obtained.

At step S7, the mobile assembly 91 is rotated in the anticlockwise direction so as to be parallel to the upper end line of the paper.

At step S8, the mobile assembly 91 is moved back and forth until an appropriate distance between the front surface of the mobile assembly 91 and the left end of the paper is obtained.

At step S9, the mobile assembly 91 is moved for a certain distance shorter-that the horizontal length of the paper. During the movement in the horizontal direction, the line sensor scan the images on the paper when the apparatus is used as an input apparatus. The read images are stored in the memory. After the movement, the mobile assembly 91 is stopped, and then the stored image data is sent to the outer processor.

The mobile assembly 91 is provided with the second mobile assembly 56 as shown in FIG. 6. When the apparatus is used as an image output apparatus, the second mobile assembly 56 moves the printing head provided at the bottom surface of the mobile assembly 91 and carries out the necessary printing, while the mobile assembly 91 is stopped.

The mobile assembly repeats the cycle of the straight driving and stop until it reaches the right end of the paper.

When the mobile assembly 91 reaches the right end of the paper, the line sensor detects the right end line so that the mobile assembly 91 is turned the direction and the above-described processes are repeated.

Until the mobile assembly 91 scan over the entire range set by the outer processor or the entire surface of the paper where the line sensor can recognize, the above-described processes are repeated.

From the foregoing description, it is apparent that, according to the present invention, there is provided an image input apparatus having a decreased size and which can pick up an image on a plate regardless of the size of the plate.

Further, according to the present invention, there is provided an image output apparatus having a decreased size and which can write an image on a plate regard less of the size of the plate.

Still further, according to the present invention, there is provided an input/output apparatus having a decreased size and which can pick up an image on a plate and write an image on a plate regardless of the size of the plate.

What is claimed is:

1. An image input apparatus for inputting images written on a plate, wherein said image input apparatus is movable on said plate and comprises:
   wheels assembled to be able to run on said plate, and
   motors for driving said wheels such that said image input apparatus moves on said plate by said motor driven wheels,
   wherein said image input apparatus has a size independent from the size of said plate, and
   said image input apparatus comprising image pick-up means for picking up images written on said plate.

2. An image input apparatus as set forth in claim 1, further comprising driving means, connected to said motors, for driving said motors in response to a driving signal sent from an outer processing means located outside of said image input apparatus.

3. An image input apparatus as set forth in claim 2, wherein said motors are pulse motors, the number of rotations being controlled by controlling said pulse motors.

4. An image input apparatus as set forth in claim 2, further comprising communication means, connected to said driving means, for transferring the driving signal sent from said outer processing means to said driving means, said driving means driving said motors in response to said driving signal transferred from said communication means.

5. An image input apparatus as set forth in claim 4, wherein said communication means comprises means for communicating with said outer processing means through a wire.

6. An image input apparatus as set forth in claim 4, wherein said communication means comprises means for communicating with said outer processing means through a wireless means.

7. An image input apparatus as set forth in claim 4, further comprising:
  analog-to digital converting means, connected to said image pick-up means, for converting an analog signal of the image picked up by said image pick-up means into a digital signal; and
  storing means, connected between said analog-to digital converting means and said communication means, for storing the digital signal obtained by said analog-to-digital converting means;
  said communication means transmitting the digital signal from said storing means to said outer processing means.

8. An image input apparatus as set forth in claim 7, further comprising:
  an internal processing means, provided in said image input apparatus and connected to said storing means, to said communication means, to said analog-to digital converting means, and to said driving means, for performing a storing operation of the digital signal from said analog-to digital converting means to said storing means, and for performing a driving operation to drive said motors through said driving means in response to said driving signal from said outer processing means through said communication means.

9. An image input apparatus as set forth in claim 4, further comprising:
  analog-to digital converting means, connected to said image pick-up means, for converting an analog signal of the image picked up by said image pick-up means into a digital signal, the digital signal being directly transmitted through said communication means to said processing means.

10. An image input apparatus as set forth in claim 1, wherein said image pick-up means comprises illumination means for illuminating the plate, light receiving means for receiving light reflected from the plate, and light pic-up means for picking up the light received by said light receiving means.

11. An image input apparatus as set forth in claim 10, wherein said light receiving means is a lens, and said light pick-up means is a camera.

12. An image output apparatus for drawing images on a plate, wherein said image output apparatus is movable on said plate and comprises:
  wheels assembled to be able to run on said plate, and motors for driving said wheels such that said image output apparatus moves on said plate by said motor driven wheels,
  wherein said image output apparatus has a size independent from the size of said plate, and
  said image output apparatus comprising printing means for printing, in accordance with given image data, images on said plate.

13. An image output apparatus as set forth in claim 12, wherein said printing means is fixedly mounted on said image output apparatus, said printing means printing said images on said plate while said image output apparatus is moving on said plate.

14. An image output apparatus as set forth in claim 13, further comprising driving means, connected to said motors, for driving said motors in response to a driving signal sent from outer processing means located outside of said image output apparatus.

15. An image output apparatus as set forth in claim 14, wherein said motors are pulse motors, the number of rotations being controlled by controlling said pulse motors.

16. An image output apparatus as set forth in claim 15, further comprising communication means, connected to said driving means, for transferring the driving signal sent from said outer processing means to said driving means, said driving means driving said motors in response to said driving signal transferred from said communication means.

17. An image output apparatus as set forth in claim 16, wherein said communication means comprises means for communicating with said outer processing means through a wire.

18. An image output apparatus as set forth in claim 16, wherein said communication means comprises means for communicating with said outer processing means through a wireless means.

19. An image output apparatus as set forth in claim 16, further comprising:
  storing means, connected to said communication means, for storing said given data sent from said outer processing means; and
  digital-to-analog converting means, connected to said storing means, for converting said given data stored in said storing means into an analog signal;
  said analog signal being supplied to said printing means, 20. An image output apparatus as set forth in claim 19, further comprising:
  an internal processing means, provided in said image output apparatus and connected to said storing means, to said communication means, to said digital-to-analog converting means, and to said driving means, for performing a storing operation of the given data from said outer processing means, for performing a driving operation to drive said motors through said driving means in response to said driving signal from said outer processing means through said communication means, and for performing a writing operation to write said image on said plate.

21. An image output apparatus as set forth in claim 20, wherein said printing means comprises writing means attached on the bottom of said image output apparatus and connected to said digital-to-analog converting means, for writing said image on said plate in response to the analog signal output from said digital-to-analog converting means.

22. An image output apparatus as set forth in claim 21, wherein said writing means comprises a pen.

23. An image output apparatus as set forth in claim 22, wherein said writing means comprises pen moving means for moving said pen in the direction perpendicular to said plate.

24. An image output apparatus as set forth in claim 21, wherein said writing means comprises an ink nozzle.

25. An image output apparatus as set forth in claim 24, wherein said writing means comprises an ink-jet printing head.

26. An image output apparatus as set forth in claim 12, further comprising second mobile assembly means mounted on said image output apparatus, for moving said printing means while said image output apparatus is stopped on said plate.

27. An image output apparatus as set forth in claim 26, wherein said second mobile assembly means comprises X-Y direction movable means provided on the bottom of said image output apparatus and operatively faced to said plate, said printing means being fixed on said X-Y direction movable means, said X-Y direction movable means being movable on said bottom of said image input apparatus in the two-dimentional direction.

28. An image output apparatus as set forth in claim 27, wherein said mobile assembly means comprises wheels assembled to be able to run on said plate.

29. An image output apparatus as set forth in claim 20, wherein said mobile assembly means further comprises motors for driving said wheels, and driving means, connected to said motors, for driving said motors in response to a driving signal sent from outer processing means located outside of said image input apparatus.

30. An image output apparatus as set forth in claim 29, wherein said motors are pulse motors, the number of rotations being controlled by controlling said pulse motors.

31. An image output apparatus as set forth in claim 30, further comprising communication means, connected to said driving means, for transferring the driving signal sent from said outer processing means to said driving means, said driving means driving said motors in response to said driving signal transferred from said communication means.

32. An image output apparatus as set forth in claim 31, wherein said communication means comprises means for communicating with said outer processing means through a wire.

33. An image output apparatus as set forth in claim 32, wherein said communication means comprises means for communicating with said outer processing means through a wireless means.

34. An image output apparatus as set forth in claim 32, further comprising:

storing means, connected to said communication means, for storing said given data sent from said outer processing means; and digital-to-analog converting means, connected to said storing means, for converting said given data stored in said storing means into an analog signal; said analog signal being supplied to said printing means.

35. An image output apparatus as set forth in claim 34, further comprising:

an internal processing means, provided in said image output apparatus and connected to said storing means, to said communication means, to said digital-to-analog converting means, and to said driving means, for performing a storing operation of the given data from said outer processing means, for performing a driving operation to drive said motors through said driving means in response to said driving signal from said outer processing means through said communication means and for performing a writing operation to write said image on said plate.

36. An image output apparatus as set forth in claim 35, wherein said printing means comprises writing means attached on the bottom of said image output apparatus and connected to said digital-to-analog converting means, for writing said image on said plate in response to the analog signal output from said digital-to-analog converting means.

37. An image output apparatus as set forth in claim 36, wherein said writing means comprises a pen.

38. An image output apparatus as set forth in claim 37, wherein said writing means comprises pen moving means for moving said pen in the direction perpendicular to said plate.

39. An image output apparatus as set forth in claim 36, wherein said writing means comprises an ink nozzle.

40. An image output apparatus as set forth in claim 39, wherein said writing means comprises an ink-jet printing head.

41. An image input/output apparatus for inputting images written on a plate and for outputting images on said plate, wherein said image input/output apparatus is movable on said plate and comprises:

wheels assembled to be able to run on said plate, and motors for driving said wheels such that said image input/output apparatus moves on said plate by said motor driven wheels;

wherein said image input/output apparatus has a size independent from the size of said plate, and said image input/output apparatus comprising:

image pick-up means, mounted on said mobile assembly means, for picking up images written on said plate, and printing means, mounted on said image input apparatus, for printing, in accordance with given image data, images on said plate.

* * * * *